(12) United States Patent
Key et al.

(10) Patent No.: US 6,349,384 B1
(45) Date of Patent: Feb. 19, 2002

(54) SYSTEM, APPARATUS AND METHOD FOR PROCESSING INSTRUCTIONS

(75) Inventors: Andrew Key; Vincent Sethi, both of Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/318,169

(22) Filed: May 25, 1999

(30) Foreign Application Priority Data

Jan. 23, 1999 (GB) .............................................. 9901452

(51) Int. Cl.[7] .............................. G06F 9/44; G06F 9/42; G06F 9/45
(52) U.S. Cl. ....................... 712/242; 712/243; 712/233; 712/234; 712/227; 712/41
(58) Field of Search ................................. 711/243, 209, 711/220, 216, 221, 200, 100, 165, 206; 712/233, 41, 42, 236, 237, 240, 241, 246, 443, 245, 248, 205, 243, 242, 227.1, 221, 216; 709/315, 310, 106; 714/47, 57; 710/260; 717/5, 9; 707/233, 234, 261, 206

(56) References Cited

U.S. PATENT DOCUMENTS 5,193,206 A * 3/1993 Mils .............................. 712/41
5,603,045 A 2/1997 Dockser .................... 395/800
5,956,758 A * 9/1999 Henzinger et al. .......... 711/213

FOREIGN PATENT DOCUMENTS

| GB | 2037035 | 7/1980 |
| GB | 2074766 | 11/1981 |
| WO | WO 97/37301 | 10/1997 |

* cited by examiner

Primary Examiner—Daniel H. Pan
(74) Attorney, Agent, or Firm—Lauren C. Bruzzone

(57) ABSTRACT

A data processing system comprises means for identifying and replacing instructions to jump to functions having known prolog instructions with modified jump instructions, means for storing the known prolog instructions, and means for retrieving the known prolog instructions when such modified instructions are found and for supplying the known prolog instructions for processing. A compiler or preprocessor is arranged to detect and modify the jump instructions. A logic module is arranged to intercept the modified instructions, retrieve from its storage the prolog instructions, and supply the prolog instructions for processing. The compiler or preprocessor is further arranged to detect and modify the first instruction of known epilog code. A logic module is arranged to intercept the modified instruction, and to retrieve and supply for processing the epilog instructions.

14 Claims, 4 Drawing Sheets

SYSTEM, APPARATUS AND METHOD FOR PROCESSING INSTRUCTIONS

FIELD OF THE INVENTION

The present invention is concerned with a system, apparatus and method for processing instructions in a data processing system, and in particular with the provision of instructions to the processor unit. The invention is concerned with the processing of instructions especially in embedded and real-time systems where performance is a concern.

BACKGROUND OF THE INVENTION

In conventional computer systems, instructions are stored in main storage and fetched from there by a memory management system for execution by a central processor unit, or possibly by some special function unit, such as a floating-point processor. In some systems, some instructions may be retained after their use in a cache memory which can be accessed more quickly than the main storage, so that such instructions can be reused later in the execution of the same program. This improves the execution performance of the computer system by reducing the time taken to fetch the instructions for processing by the central processing unit.

In systems having caching, the number of cycles taken to retrieve an instruction depends on whether it is already in the cache or not. If it is not (a "cache miss"), the instruction must be fetched from main memory, and this can leave the processor "stalled" for one or more processor cycles, thus returning the processing performance of the system to the same level as it would have been without the cache.

A particular instance of this loss of performance is in the case of a branch or jump instruction to an address which is not in the cache. There are three possible branch or jump cases. In the first, a backward jump within a function, the addressed instructions are quite likely to be in the cache, so performance is typically not badly affected. In the second, a forward jump within a function, programming means are available to arrange the instructions within the function to optimize performance by, for example, placing the fastest case first; in this case, performance is typically at the discretion of the programmer. In the third case, a jump to a new function, there can be a considerable performance cost when the address to be jumped to is not cached. This is so even in systems where the caching subsystem only stalls the processor until the first word of a cache line has been fetched, rather than the whole cache line; the delay can still be considerable in comparison with the instruction execution rate of a modern processor.

The performance problem outlined above is exacerbated by the increasing tendency to develop code using compiled high-level languages. Formerly, much code was developed in low-level languages close to the level of the machine instructions of the processor. This gave programmers the opportunity to trim their code strictly to reduce the numbers of instructions to a bare minimum. However, such development methods required the luxury of considerable programmer time, and so there developed the tendency to use compiled high-level languages, in which a single programmer instruction can represent many machine instructions. This tendency is to be found even for code that is performance-sensitive, such as code for embedded processors: device controllers, real-time processors, and the like. Such generated code often does not contain large amounts of iteration, can be very large, and can contain many jumps between procedures or functions. It can also contain redundant instructions, such as data type tests for data types that might never be encountered during any real execution of the program. In such code, there can be significant performance costs, not all of which can be adequately handled by typical automated code optimization. In a modern embedded processor, which is very fast, the memory subsystem typically uses caching to reduce the amount of time the processor must wait for instructions and data. However, as described above, caching does not solve the problem of the jump to an uncached address.

One way of dealing with this particular problem is to look ahead in the code and prefetch one or more instructions from the jumped-to code, but this involves the use of extra instruction cycles to look ahead and fetch the jumped-to instructions into the cache. It also increases the program's consumption of memory bandwidth. The cached instructions also take up space in the cache, which is of limited size. In some cases, this use of resources will all be wasted as the jump might depend on some condition that is not encountered, and thus might not be taken during this particular execution of the program. Cache size presents a problem particularly in embedded systems, and it is the combination of the cache size problem with the problem of processor stalls that forms the background to the present invention.

DISCLOSURE OF THE INVENTION

Accordingly, in a first aspect, the present invention provides a data processing system, comprising means for identifying one or more jump instructions to jump to functions having known prolog instructions, means, responsive to said means for identifying, for replacing said jump instructions with one or more modified jump instructions, means for storing said known prolog instructions, means responsive to said modified jump instructions for retrieving said known prolog instructions from said means for storing, and means for supplying said known prolog instructions for processing.

A data processing system as described is advantageous in embedded systems, such as device controllers, but is also advantageous in any general purpose data processing system, where the logic module may be either a hardware logic module or a software module.

Preferably a data processing system as described further comprises means for identifying known epilog instructions, means, responsive to said means for identifying, for replacing a first instruction of said known epilog instructions with one or more modified instructions, means for storing said known epilog instructions, means responsive to said modified instructions for retrieving said known epilog instructions from said means for storing, and means for supplying said known epilog instructions for processing.

Preferably in such a data processing system, said means for identifying and said means for replacing form part of a compiler or of a preprocessor.

Preferably also, in such a data processing system, said means for storing, said means for retrieving and said means for supplying form part of a logic module, which may be a hardware logic module.

In a second aspect, the present invention provides apparatus for supplying instructions to a processor unit, comprising means for identifying one or more jump instructions to jump to functions having known prolog instructions, means for storing said known prolog instructions, means (responsive to said means for identifying) for retrieving said known prolog instructions from said means for storing, and means for supplying said known prolog instructions for processing by said processor unit.

Preferably, the apparatus as described further comprises means for identifying one or more instructions to execute known epilog instructions, means for storing said known epilog instructions, means, responsive to said means for identifying, for retrieving said known epilog instructions from said means for storing, and means for supplying said known epilog instructions for processing by said processor unit.

Preferably said apparatus is a logic module, which may be a programmable logic module.

In a third aspect, the present invention provides a method for supplying instructions to a processor unit, comprising the steps of identifying one or more first instructions to jump to functions having known prolog instructions, storing, by a logic module, said known prolog instructions, replacing said first instructions with one or more modified jump instructions, identifying, by said logic module, said modified jump instructions, retrieving, by said logic module, said known prolog instructions, and supplying said known prolog instructions by said logic module to said processor unit.

Preferably, the method as described further comprises the steps of identifying one or more second instructions to execute known epilog instructions, storing, by a logic module, said known epilog instructions, replacing said second instructions with one or more modified instructions, identifying, by said logic module, said modified instructions, retrieving, by said logic module, said known epilog instructions, and supplying said known epilog instructions by said logic module to said processor unit.

Preferably, the method of the third aspect of the present invention is further characterised in that the steps of identifying and replacing said first or said second instructions are carried out by a compiler or a preprocessor.

The present invention advantageously exploits the fact that compiler generated prolog code for many functions forms standard blocks with limited variations. In most cases, for example, the prolog code sets up a local environment, a "stack frame", a set of base registers, or in some way establishes the addressability of some local storage elements. Thus, it is possible to analyze and extract the patterns, which may then be stored in a separate logic module ready for immediate use, so that the processor unit is not stalled waiting for these standard groups of instructions. Typically, by the time these instructions have been executed, the next instructions will have been fetched from the main memory of the system, ready to continue the normal processing of the main body of the function or procedure. In order to cause the logic module to intercept the jump instruction and supply the known prolog instructions, a compiler or preprocessor is used to modify the jump instruction from its normal form of "jump to X" to the form of "jump to X with prolog P". The logic module is arranged to recognize this modified instruction and to respond by avoiding the normal fetch operation for the prolog instructions, thus causing the next fetch to come into effect for the remainder (or the first part of the remainder) of the instructions. It also supplies the known prolog instructions directly to the processor unit for processing.

In systems where cache size and use is a limiting factor, the present invention can be advantageously extended to reduce cache-dependence for epilog code by applying the same technique: that is, the start of the epilog code can be signalled to the logic module, which can then supply instructions directly from its own internal storage to the processor, thus reducing the need for storage space in the cache.

BRIEF DESCRIPTION OF THE DRAWINGS

An embodiment of the present invention will now be described by way of example, with reference to the drawings, in which:

In FIG. 1, a data processing system (101) comprises a source code program (102), a compiler or preprocessor (103), and a database of known prolog instructions (104). As the compiler or preprocessor (103) processes the source code program (102), it identifies a jump instruction (105) within the source code. The compiler or preprocessor then analyses the target function or procedure (106) of the jump instruction, and compares the instructions (107) found there with the contents of the database of known prolog instructions (104). If the compiler or preprocessor finds a match, it replaces the jump instruction with a modified jump instruction (108) and continues processing in a conventional manner to produce an executable program (109).

FIG. 2 shows the sequence of steps as described above, where each instruction in the source code program is tested (201) to see if it is a jump instruction. If so, it is tested (202) to see if the instructions at the target function or procedure match a known prolog. If both tests are passed, the jump instruction is replaced (203) with a modified jump instruction.

FIG. 3 shows a data processing system (301) comprising a processor unit (302), a main memory (303), a cache memory (304), and a logic module (305) having stored within its internal storage the known prolog instructions (306). The data processing system functions conventionally with respect to fetching executable instructions (307) from main memory (303) or from cache memory (304) for processing by the processor unit (302). However, the logic module (305) monitors the stream of executable instructions (307) until it detects a modified jump instruction (308), at which time the logic module (305) prevents or avoids the fetching of the prolog instructions (309) from the main memory (303), and instead retrieves them from the location within itself where it has them stored. Logic module (305) then supplies the known prolog instructions (306) directly to the processor unit (302).

Figure 1:
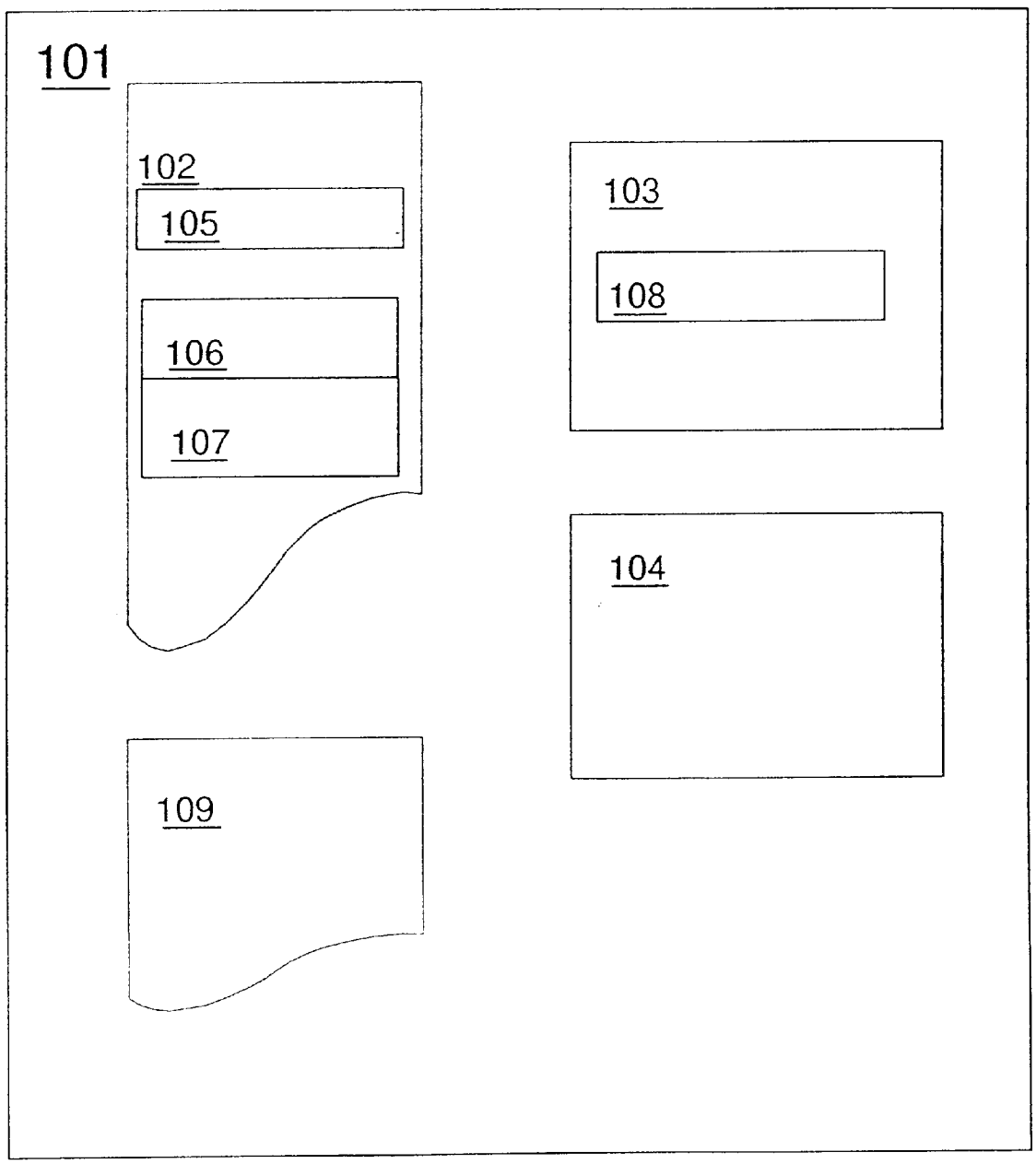
FIG. 1 is a block diagram of a data processing system according to the present invention.
Figure 2:
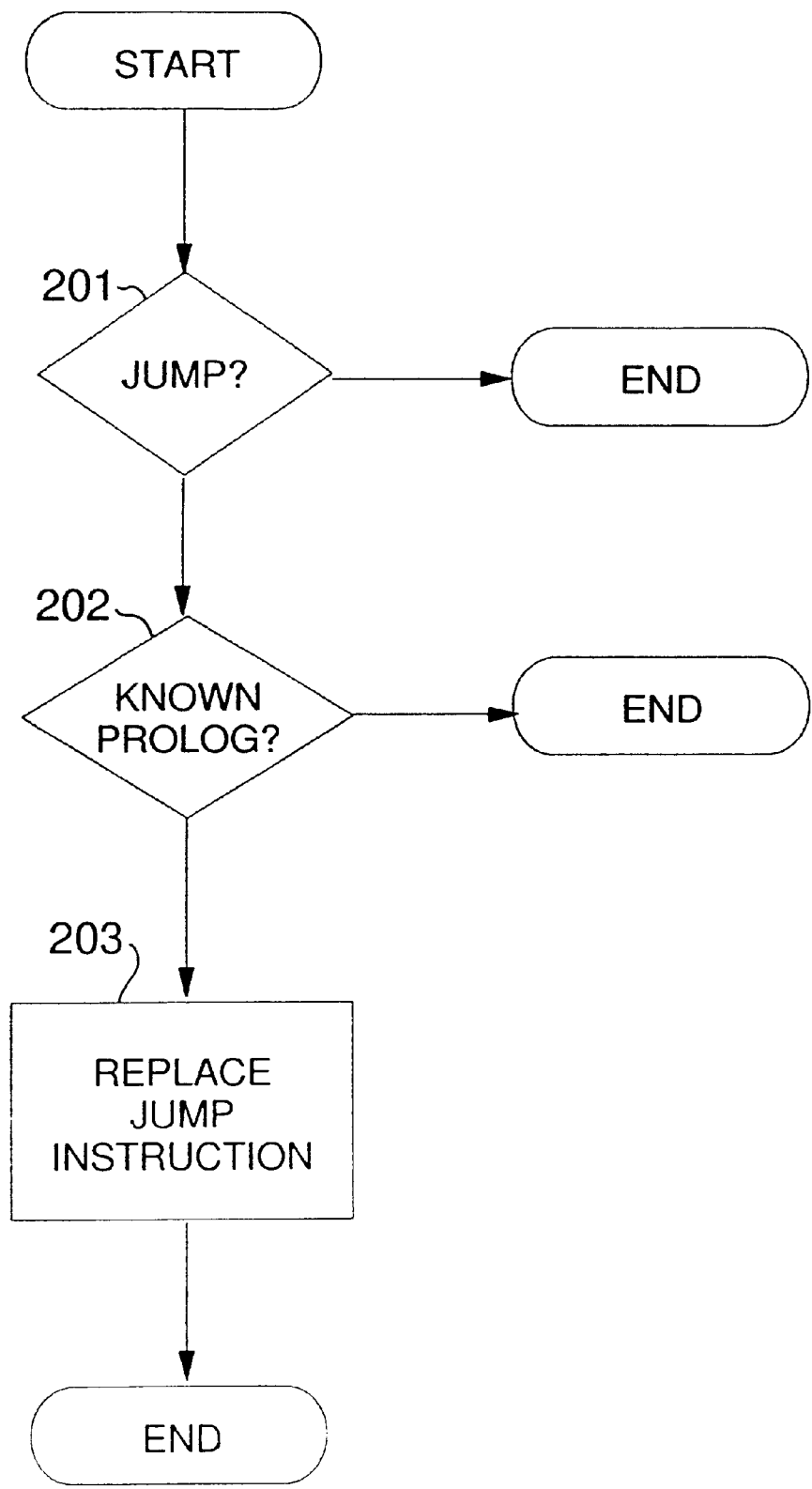
FIG. 2 is a flow diagram showing the steps of a method according to the present invention.
Figure 3:
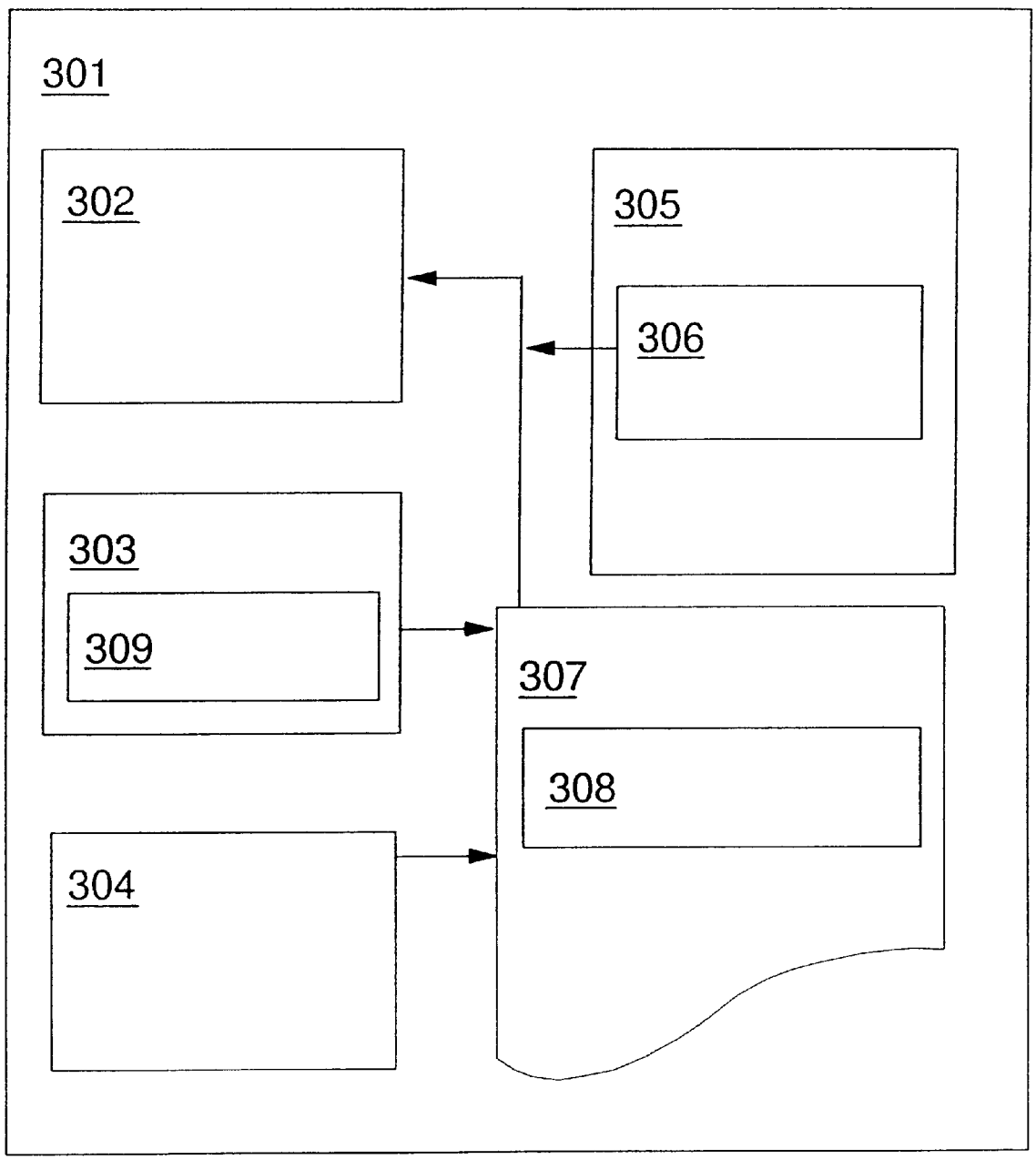
FIG. 3 is a block diagram of a data processing system according to the present invention.

In an embodiment of the present invention, an embedded software program in ARM6 Assembler language (ARM is a registered trademark of ARM Limited) consists of 210 kilobytes of code. The software program has 1158 functions, of which 695 start with a common set of prolog instructions as follows:

mov r12,r13 stmfd r13!, {xxx,r11,r12,r14,r15} sub r11,r13,#4

In 360 cases, the prolog continues with a mov r4,r0 instruction. In this prolog code, xxx can be replaced by nothing, r4, r4–r5,r4–r6, r4–r7, r4–r8,r4–r9, or r4–r10. There is thus a set of 14 possible known common prolog instruction sequences, which can be stored in the logic module (305) ready for immediate use. In the same code, on examining the branch and branch-and-link instructions, which allow 24 bits for the branch offset, the top six bits are always either 000000 or 111111. By setting the top two bits to either 01 or 10 and encoding the appropriate prolog number in the next 4 bits, it is possible to modify the instruction to indicate that this branch or branch-and-link instruction is a branch or branch-and-link to one of the fourteen known sequences of prolog instructions.

Figure 4:
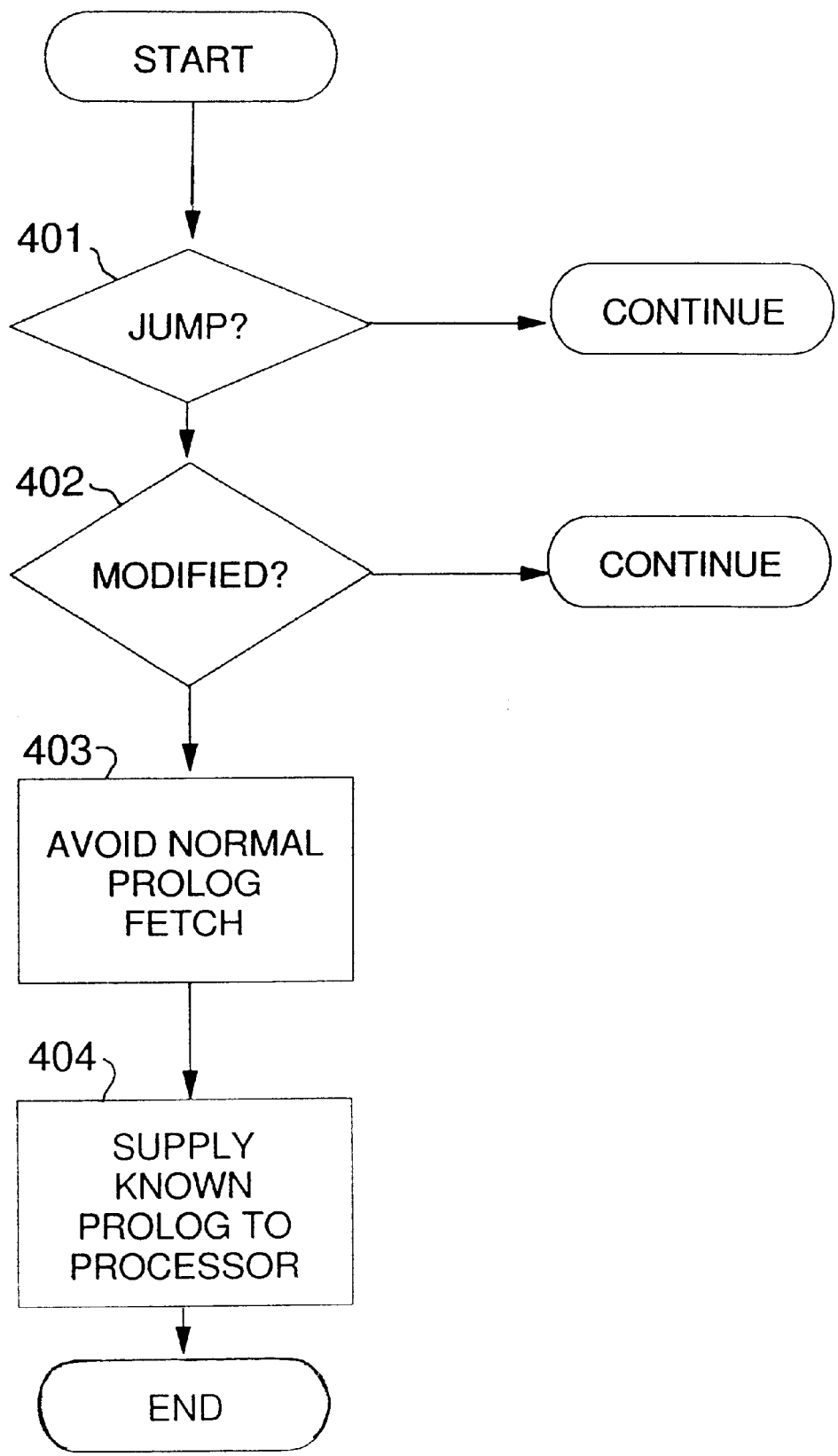
FIG. 4 is a flow diagram showing further steps of a method according to the present invention.

In FIG. 4, the logic module (305) tests (401) incoming instructions for jump instructions, tests (402) the top two bits for the 01 or 10 pattern, tests (403) the next four bits for the known prolog identifier, avoids (405) the normal fetch of the instructions from main memory, retrieves (406) the known prolog instructions from its own internal storage, and supplies (407) them to the processor unit (302) for processing. The step of avoiding (405) the normal fetch may be omitted, as by the time the cache line containing the known prolog instructions has been fetched, the instruction counter of the processor unit will have already been incremented beyond the addresses of the known prolog instructions contained in the cache line.

During the processing of the known prolog instructions, the logic module (305) must monitor the interrupt line or the fetched addresses for any exceptional conditions. For example, if an interrupt is raised, or if a fetched address is not the address of the next expected instruction, the logic module must cease its processing and return control so that the interrupt or exception can be appropriately handled.

What is claimed is:

1. A data processing system, comprising:
   means for identifying one or more jump instructions to jump to functions having known prolog instructions;
   means, responsive to said means for identifying, for replacing said jump instructions with one or more modified jump instructions;
   means for storing said known prolog instructions;
   means responsive to said modified jump instructions for retrieving said known prolog instructions from said means for storing; and
   means for supplying said known prolog instructions for processing.

2. A data processing system as claimed in claim 1, further comprising:
   means for identifying known epilog instructions;
   means, responsive to said means for identifying, for replacing a first instruction of said known epilog instructions with one or more modified instructions;
   means for storing said known epilog instructions;
   means responsive to said modified instructions for retrieving said known epilog instructions from said means for storing; and
   means for supplying said known epilog instructions for processing.

3. A data processing system as claimed in claim 2, wherein said means for identifying and said means for replacing form part of a compiler.

4. A data processing system as claimed in claim 2, wherein said means for identifying and said means for replacing form part of a preprocessor.

5. A data processing system as claimed in claim 1, wherein said means for identifying and said means for replacing form part of a compiler.

6. A data processing system as claimed in claim 1, wherein said means for identifying and said means for replacing form part of a preprocessor.

7. A data processing system as claimed in claim 1, wherein said means for storing, said means for retrieving and said means for supplying form part of a logic module.

8. A data processing system as claimed in claim 7, wherein said logic module is a hardware logic module.

9. A method for supplying instructions to a processor unit, comprising the steps of:
   identifying one or more first instructions to jump to functions having known prolog instructions;
   storing, by a logic module, said known prolog instructions;
   replacing said first instructions with one or more modified jump instructions;
   identifying, by said logic module, said modified jump instructions;
   retrieving, by said logic module, said known prolog instructions; and
   supplying said known prolog instructions by said logic module to said processor unit.

10. A method as claimed in claim 9, further comprising the steps of:
    identifying one or more second instructions to execute known epilog instructions;
    storing, by a logic module, said known epilog instructions;
    replacing said second instructions with one or more modified instructions;
    identifying, by said logic module, said modified instructions;
    retrieving, by said logic module, said known epilog instructions; and
    supplying said known epilog instructions by said logic module to said processor unit.

11. A method as claimed in claim 10, further characterised in that the steps of identifying and replacing said second instructions are carried out by a compiler.

12. A method as claimed in claim 10, further characterised in that the steps of identifying and replacing said second instructions are carried out by a preprocessor.

13. A method as claimed in claim 9, further characterised in that the steps of identifying and replacing said first instructions are carried out by a compiler.

14. A method as claimed in claim 9, further characterised in that the steps of identifying and replacing said first instructions are carried out by a preprocessor.

* * * * *